Aug. 5, 1969    M. DAVIS    3,458,979
FILTERS
Filed Sept. 12, 1967    2 Sheets-Sheet 1
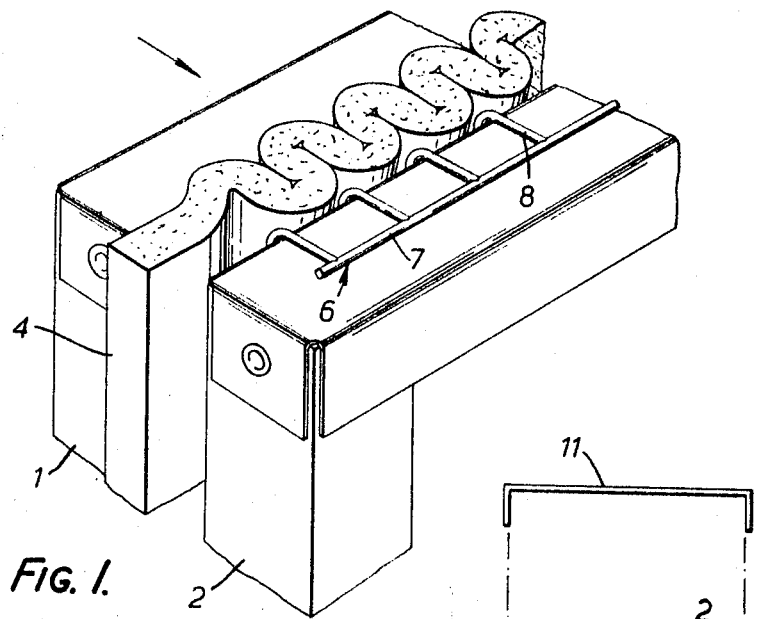
FIG. 1.
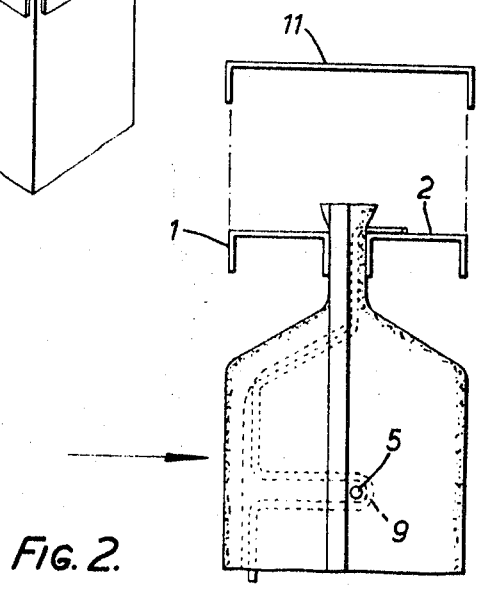
FIG. 2.
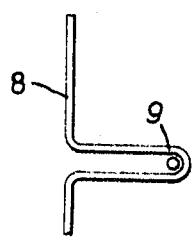
INVENTOR
MAURICE DAVIS
BY
Holcombe, Wetherill & Brisebois
ATTORNEYS Aug. 5, 1969   M. DAVIS   3,458,979
FILTERS Filed Sept. 12, 1967   2 Sheets-Sheet 2

INVENTOR
MAURICE DAVIS
BY
Holcombe, Wetherill & Brisebois
ATTORNEYS

United States Patent Office 3,458,979
Patented Aug. 5, 1969

3,458,979
FILTERS
Maurice Davis, West Croydon, England, assignor to Davis Industrial Equipment Company Limited
Filed Sept. 12, 1967, Ser. No. 667,263
Int. Cl. B01d 25/00
U.S. Cl. 55—499
2 Claims

ABSTRACT OF THE DISCLOSURE

A filter element comprising a sheet of filter medium and tie means holding the sheet in corrugated form, the tie means comprising a plurality of ties each of which passes through spaced apart apertures in the sheet and is enlarged at its ends adjacent the outermost of said apertures, the length of the tie between its end enlargements being less than the dimension between said outermost apertures.

---

This invention is concerned with improvements in and relating to filters.

According to one aspect of this invention there is provided a filter element comprising a sheet of filter medium and tie means holding the sheet to corrugated form.

In order that the invention may be well understood there will now be described one embodiment thereof, given by way of example only, reference being had to the drawing accompanying the specification, in which:

FIGURE 1 is a fragmentary isometric view of one corner of an air filter embodying the invention;

FIGURE 2 is a section through the upper edge of the filter of FIGURE 1;

Figure 3:
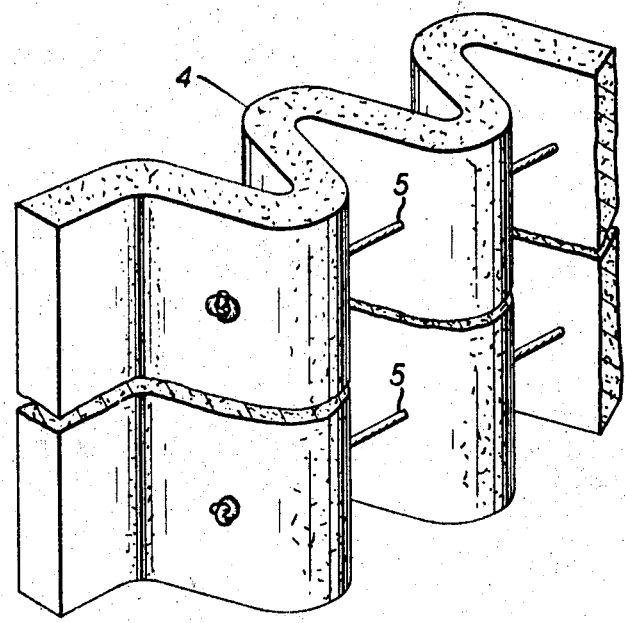
FIGURE 3 is a fragmentary isometric view of a filter element incorporated in the filter of FIGURES 1 and 2.
Figure 4:
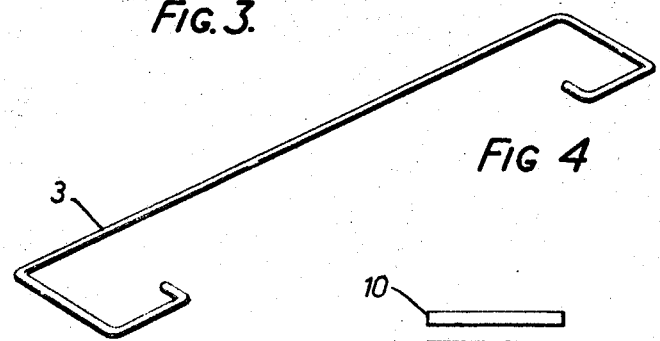
FIGURE 4 is a view of a frame clip of said filter.

The air filter comprises two rectangular frames 1, 2 of suitable material such as wood, metal or plastics. Between the frames which are urged together as by a pair of clips 3 spanning one frame and passing round opposite sides of the other frame, is a filter element 4 which may be of foamed synthetic plastics material of which the cell walls have been ruptured. This sheet has a number of apertures through which extend tie strings 5, preferably of plastic coated cord, which are knotted at their ends and which are so dimensioned relative to the outermost apertures through which they pass as to draw the sheet into corrugated form. The material of the element being compressible, the frames will engage both the corrugated edges and the plain edges of the element, and air passing through the frames will have to pass through the filter element.

A wire support 6 may be provided comprising side wires 7 and spaced cross wires 8, the latter shaped to engage one frame outside which the side wires will lie and to engage in the corrugations on the downstream side of the filter element. The wires 8 have U-shaped parts 9 to accept the tie strings.

Figure 5:
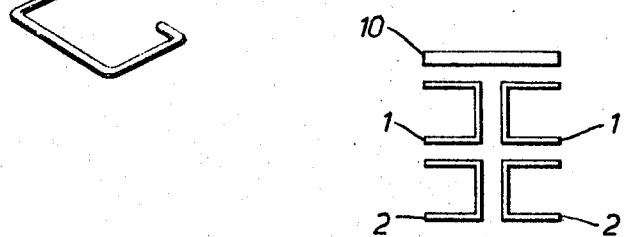
FIGURE 5 is a fragmentary view showing two of said filters when mounted.

The filters may be mounted side by side on a lattice framework in a filter installation as indicated in FIGURE 5 where two frames 1 are bolted to a lattice 10 and their associated frames 2 are held as by the clips 3. Each clip spans its frame 1 between that frame and the lattice, the clips being sufficiently resilient that the end parts can be moved apart to accept the element and frame 2 and to snap back to hold the frame 2 in place, clamping the element between the frames.

Instead of mounting the filters on a lattice framework they may be mounted between oppositely facing channel section runners in an alternative filter installation, one of the runners being indicated at 11 (FIGURE 2), the internal dimension between the flanges of a channel being such that the frames will be spaced by an amount sufficient to compress the element between them. In this case, no clips 3 are required.

What I claim is:

1. A filter element comprising a rectangular sheet of foamed synthetic plastic material in which the cells have been ruptured, said sheet being formed into a plurality of spaced parallel corrugations and provided with spaced parallel rows of apertures, each lying intermediate the crests of the corrugations, a plurality of parallel and substantially planar tie strings, each extending through a corresponding row of apertures transversely of the corrugations, at least one of said tie strings being positioned near each end of said sheet, and each tie string carrying stops of a larger size than the apertures adjacent the ends thereof retaining said corrugations of said sheet in spaced relationship.

2. The filter element of claim 1 including a pair of rectangular peripheral frames between which the peripheral edge of the sheet is clamped, and an element support comprising a plurality of parallel spaced cross pieces each extending within a respective corrugation, said cross pieces being contoured to clear the tie strings, side pieces connected to the ends of the cross pieces and means clamping the filter element and support between the frames.

References Cited

UNITED STATES PATENTS

| 720,084 | 2/1903 | Thurman | 55—381 |
|---|---|---|---|
| 2,080,154 | 5/1937 | Strindberg | 55—500 |
| 2,074,294 | 3/1937 | Woodruff | 55—500 |
| 2,914,179 | 11/1959 | Foust | 210—493 |
| 2,915,426 | 12/1959 | Poelman | 210—493 |
| 3,127,258 | 3/1964 | Revell | 55—500 |
| 3,144,315 | 8/1964 | Hunn | 55—522 |
| 3,177,637 | 4/1965 | Davis | 55—522 |
| 3,190,059 | 6/1965 | Bauder et al. | 55—500 |
| 3,227,592 | 1/1966 | Coates et al. | 55—499 |
| 3,250,063 | 5/1966 | Andrews | 55—484 |

HARRY B. THORNTON, Primary Examiner

BERNARD NOZICK, Assistant Examiner

U.S. Cl. X.R.

55—500, 503, 511, 521; 210—493